Figure 1:
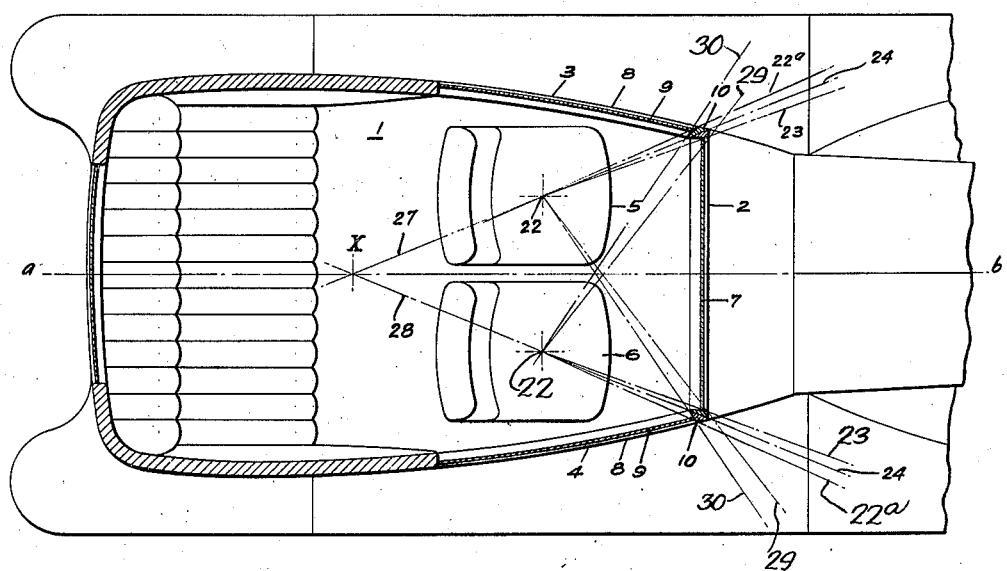

Nov. 24, 1936.    E. A. WRIGHT    2,061,788
AUTOMOBILE BODY
Filed March 1, 1926

INVENTOR
EDWARD A. WRIGHT
BY White Prost
HIS ATTORNEYS

Patented Nov. 24, 1936

2,061,788

UNITED STATES PATENT OFFICE 2,061,788

AUTOMOBILE BODY

Edward A. Wright, Fresno, Calif.

Application March 1, 1926, Serial No. 91,322

10 Claims. (Cl. 296—28)

This invention relates to bodies for automobiles and has for its object the provision of means for increasing the visibility of the occupants of the automobile.

More particularly, the invention relates to automobiles of the closed type which are provided with pillars at the front corners of the car body for supporting the windshield and other parts forming the front closure as well as the respective adjacent sides. Heretofore such front pillars have been designed primarily with a view to having the necessary supporting strength for the several parts secured thereto without regard to the effect of the same upon the visibility of the occupants of the automobile, particularly, the driver. It is an object of the present invention to reduce the size of such front pillars and to so form the same as to practically eliminate the same as an obstruction of visibility without sacrificing the supporting qualities of the same. Heretofore the minimum average thickness of such front pillars has been about four inches, which at a distance of 20 inches in front of one's eyes cuts off a wide angle of vision. Twenty inches corresponds to the average distance between the driver's eyes when seated in an automobile and the nearest front pillar. If this width of the front pillar is reduced to 2½ inches or less, blind spots at the front corners of the automobile are entirely removed because the eyes of the average individual are approximately 2½ inches apart and therefore are able to see around any object less than this width. For example, if an opaque object 2 inches wide is held 20 inches from the eyes, one can see all objects more than 80 inches distant. The invention thus resides in the provision of a front pillar of sufficient strength to support the usual parts thereon and of a width sufficiently narrow to eliminate blind spots at the front corners of the automobile in the visibility of an occupant seated in the car.

The invention possesses other advantageous features, some of which, with the foregoing, will be set forth at length in the following description, where I shall outline in full, that form of my invention which I have selected for illustration in the drawing accompanying and forming part of the present specification. In said drawing I have shown one form of automobile body embodying my invention, but it is to be understood that I do not limit myself to such form, since the invention as set forth in the claims, may be embodied in a plurality of forms.

Figure 2:
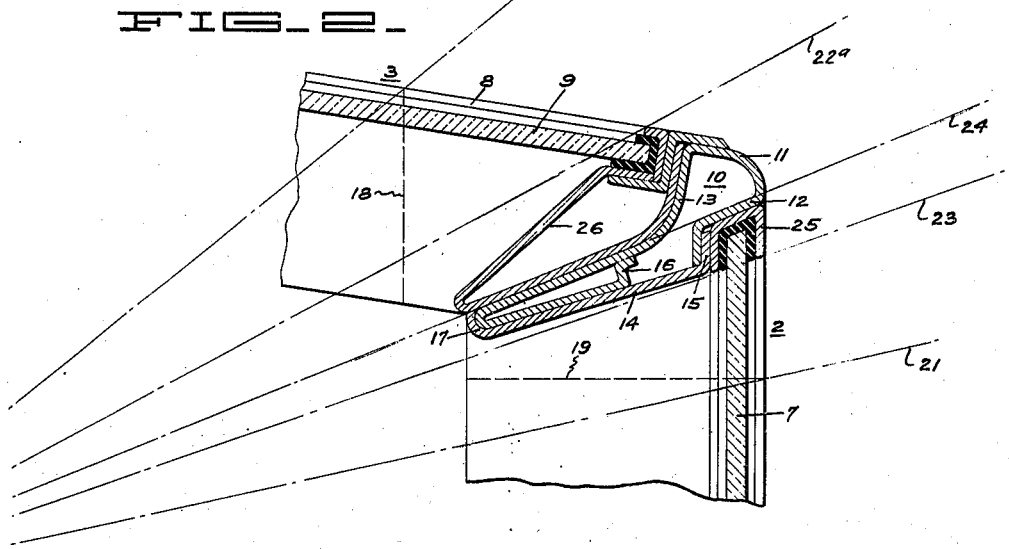

Referring to the drawing:

Fig. 1 is a plan view of an automobile body partly in section and with parts omitted and with vision lines indicated thereon to illustrate the principle of my invention, and Fig. 2 is a sectional view of a preferred form of a front pillar embodying my invention, with fragments of adjacent parts and vision lines illustrated.

In Fig. 1, I have shown an automobile body 1, having a front end 2, sides 3 and 4, and front seats 5 and 6, the seat 5 being the seat usually occupied by the driver of the automobile. The body 1 is a conventional type of closed automobile shown for the purpose of illustrating my invention and it is to be understood that the same is not limited to any particular type of car, since it may be embodied in any type of closed car in which the front end and adjacent sides are supported by front pillars at the corners.

The front end 2 of the car comprises the usual glass windshield 7 and other adjacent parts such as glass windows, not illustrated. The sides 3 and 4 are of the usual type having a solid lower portion and an upper glass portion. The upper portion may be a window or the entire part of the side forming its front end may be a door 8 having a glass window 9 as illustrated in Fig. 2. The invention is applicable to automobiles having a wooden or a steel body, the latter type being shown in the drawing. In Fig. 2, a front pillar embodying a preferred form of the invention is indicated at 10. The pillar is of small cross section and of narrow width being designed particularly with respect to the lines of vision of occupants of the car seated in the front seats 5 and 6. The pillar 10 is formed with a corner portion 11 having sides 12 and 13 and an elongated extension 14 extending rearwardly at an angle in line with the normal line of vision of the automobile driver. As shown in Fig. 1, both of the front pillars 10 are positioned so that lines thru the same converge at a point X in the rear of the front seats and on the center line a—b of the car body and pass through the centers of seats 5 and 6. Preferably the side 13 forms a continuous curved surface with the rear portion 14 so as to form a side frame for the door 8. Preferably, the rear portion 14 is formed with a shoulder 15 adjacent the side 12 so as to form a seat for the wind shield 7 or other parts which may be secured thereto in any suitable manner. While the front pillar could be made of wood or other material and be solid in construction, it is preferably made of steel, as above indicated, and of hollow construction. Such a construction may assume various forms. In Fig. 2, the front portion comprising the sides 12 and 13 and that portion of the side 13 forming a wall of the rear portion 14 is of one piece of sheet steel bent to the proper contour. The end of this piece is bent inwardly and formed with a shoulder 16 for reinforcing the pillar. The other side of the rear portion is formed with a flat piece of steel formed with a curved end 17 which bends around the rear end of the portion 14 and extends forwardly so as to overlap the shoulder 15.

The usual size of a front pillar of the type heretofore used is indicated by the dotted lines 18 and 19 in Fig. 2. Thus, the vision of an occupant is obstructed to the extent of the angle formed by the vision lines 20 and 21 in Fig. 2 which are drawn from a point 22 indicated in Fig. 1 which corresponds to the point of view of the driver of the car in seat 5 which is theoretically the center of the seat. From this it is evident that the blind spot or shadow cast by the old type of pillar is comparatively large and obstructs a substantial portion of the field of vision. By my invention, this obstruction by the adjacent pillar is reduced to an angle between the vision lines 22a and 23 and by the other pillar is reduced to an angle between the vision lines 29 and 30, all of which are drawn from the same point 22. Each front corner post assembly thus lies substantially within the angle formed by the intersecting vision lines 23 and 30, one face being determined by the vision line past said corner post assembly of the occupant of the adjacent seat, and the adjacent face being determined by the vision line past said corner post assembly of a person seated on the opposite side of the vehicle. As above indicated, the width of the front pillar is reduced to 2½ inches or less so as to practically eliminate the blind spot altogether and thus give the driver a clear unobstructed view. Each front pillar may be described as a flat pillar of narrow width positioned at an angle in line with its center line of vision indicated at 24, each of which is drawn from the center 22 of its respective seat 5 or 6 to the adjacent one of the front corners. By the arrangement described, the frame portion 25 of the windshield is positioned in front of the lug 15, thus eliminating any obstructed vision thereby. The curved surface 13 forms a pocket for the door frame 26 thus further compacting the arrangement of solid parts adjacent the front pillar. The elongated rear portion 14 is provided to give the front pillar the necessary supporting strength and its position with respect to the point of view 22 is such as practically to eliminate a blind spot in the vision. While I have referred to the visibility of the driver of the car in describing the invention above, it is obvious that similar advantages accrue to other occupants of the car as indicated by the vision lines 27 and 28 in Fig. 1. In view of the foregoing detailed description of the invention, it is believed that the same will be understood without further comment.

I claim:

1. In an automobile body, means for eliminating blind spots in the visibility of the driver of the automobile comprising a front corner pillar having a forward portion of small cross-section, a shoulder adjacent one side of said portion against which the windshield rests and of sufficient depth to receive the opaque parts thereof, an elongated part adjacent said shoulder extending rearwardly at a predetermined angle, the other side of said portion and the adjacent surface of said part being formed to provide a pocket for a door, the frame of said door adjacent said part extending rearwardly at a predetermined angle, whereby the opaque parts of the door and windshield adjacent the pillar, and the pillar have a maximum width of less than the normal distance between the eyes of an individual when viewed by an occupant of the adjacent front seat.

2. In a vehicle construction in combination: a body post provided with a front face substantially in alignment with the driver's forward line of vision past said post; and a windshield end frame member having a front face normally in substantial alignment with the front face of said body post.

3. In an automobile body, a front corner pillar having a forward portion, a shoulder projecting laterally from one side of said portion, an opaque windshield part overlapping said shoulder, an elongated part extending rearwardly and inwardly from said shoulder toward the adjacent seat occupant, the other side of said forward portion and said elongated part being formed to provide a pocket for a door, and a door frame adjacent said elongated part extending rearwardly and inwardly toward said adjacent seat occupant.

4. In an automobile body having transversely arranged seats for a first occupant and a second occupant, a front corner pillar, a door frame in juxtaposition therewith, the periphery of said pillar and said frame together being substantially polygonal in horizontal cross-section, two sides of the polygon remote from said first occupant following the general contours of the body, another forward side of said polygon being substantially in alignment with the said first occupant's forward line of vision past said pillar, and another side of said polygon being substantially in alignment with said second occupant's forward line of vision past said pillar.

5. In an automobile body having transversely arranged seats for a first occupant and a second occupant, a front corner post having a face substantially in alignment with said first occupant's forward line of vision past said post, and an adjacent face substantially in alignment with said second occupant's forward line of vision past said post.

6. In a vehicle body in which an occupant can be seated, a body post provided with a front face substantially in alignment with said occupant's forward line of vision past said post, a windshield, and means for holding said windshield in position with respect to said post, said means having a face in substantial alignment with said occupant's forward line of vision past said means.

7. In a vehicle body having transversely arranged seats for a first occupant and a second occupant, a body post assembly including a windshield holding means, a door frame, and a front corner pillar; said frame, said holding means and said pillar substantially coinciding in outline on a horizontal cross-section with a polygon, a front face of which is in substantial alignment with said first occupant's forward line of vision past said body post assembly and an adjacent face of which is in substantial alignment with said second occupant's forward line of vision past said body post assembly.

8. In an automobile body having a driver's seat, a passenger's seat, a front corner post adjacent said passenger's seat, a side glass-supporting member in juxtaposition therewith and having an opaque surface to the rear substantially in line with the driver's line of vision past said member.

9. In a vehicle body having transverse seats for a first occupant and a second occupant, an adjacent corner post assembly comprising a windshield holding means, a front corner pillar, and a rear glass supporting means, one face of which assembly is substantially in line with said first occupant's line of vision past said assembly, and an adjacent face of which is substantially in line with said second occupant's line of vision past said assembly.

10. In a vehicle body having transverse seats for a first occupant and a second occupant, an adjacent corner post assembly comprising a windshield holding means, a front corner pillar, and a rear glass supporting means, one face of which assembly is substantially in line with said first occupant's line of vision past said assembly, an adjacent face of which is substantially in line with said second occupant's line of vision past said assembly, and the remaining periphery of said assembly following the general contours of the body.

EDWARD A. WRIGHT.